(12) United States Patent
Zoss

(10) Patent No.: US 9,045,262 B2
(45) Date of Patent: *Jun. 2, 2015

(54) PACKAGES FOR DISPENSING LIQUID AND DRY FOOD

(75) Inventor: Robert A. Zoss, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 881 days.

This patent is subject to a terminal disclaimer.

(21) Appl. No.: 12/610,655

(22) Filed: Nov. 2, 2009

(65) Prior Publication Data

US 2010/0112146 A1    May 6, 2010

Related U.S. Application Data

(63) Continuation-in-part of application No. 12/384,709, filed on Apr. 8, 2009, now Pat. No. 8,485,378, and a continuation-in-part of application No. 12/456,015, filed on Jun. 10, 2009, and a continuation-in-part of application No. 12/456,014, filed on Jun. 10, 2009, now Pat. No. 8,815,318.

(60) Provisional application No. 61/131,508, filed on Jun. 10, 2008.

(51) Int. Cl.
| | | |
|---|---|---|
| *B65D 43/02* | (2006.01) | |
| *B65D 85/816* | (2006.01) | |
| *B65D 81/26* | (2006.01) | |

(Continued)

(52) U.S. Cl.
CPC .......... *B65D 43/0212* (2013.01); *B65D 85/816* (2013.01); *A47G 19/02* (2013.01); *B65D 81/262* (2013.01); *A47J 43/27* (2013.01); *A47G 19/2272* (2013.01); *B65D 25/04* (2013.01); *B65D 81/32* (2013.01); *B65D 2543/00046* (2013.01)

(58) Field of Classification Search
CPC . A47G 19/02; A47G 19/2272; B65D 81/262; B65D 85/816; B65D 2543/00046; B65D 81/32; B65D 25/04; B65D 1/24; A47J 43/27
USPC .......... 426/115, 120, 130, 394; 206/219–222, 206/4.07; 220/501, 23.83, 23.86, 527–530, 220/553, 554, 580, 710, 731; 222/129, 222/142.1, 142.2, 143, 145.1; 99/323
See application file for complete search history.

(56) References Cited

U.S. PATENT DOCUMENTS 2,529,114 A * 11/1950 Tellier ............................ 220/713
3,040,897 A *  6/1962 Holman ........................ 210/244

(Continued)

FOREIGN PATENT DOCUMENTS

| WO | WO 02/064494 A1 | 8/2002 |
| WO | WO 02/066339 A1 | 8/2002 |
| WO | WO 2007/002623 A2 | 7/2007 |

OTHER PUBLICATIONS

Harriet Carter, "*Cereal-on-the-Go*," http://www.harrietcarter.com/index.cfm/fuseaction/product.detail/categoryID/C64C0157-E9A3-473A-A54B-8320E49D5237/productID/48C530B8-3BC1-4ACF-B37A-F13657422B8.

(Continued)

*Primary Examiner* — Drew Becker
*Assistant Examiner* — Luana Z Long
(74) *Attorney, Agent, or Firm* — Michaele A. Hakamaki; John L. Crimmins

(57) ABSTRACT

Describe are food packages having features such as multiple containers in a single package; the packages can contain multiple food products including (for example) cereal and milk, for consumption together in a convenient manner.

12 Claims, 11 Drawing Sheets

(51) Int. Cl.
*A47J 43/27* (2006.01)
*B65D 25/04* (2006.01)
*B65D 81/32* (2006.01)
*A47G 19/02* (2006.01)
*A47G 19/22* (2006.01)

(56) References Cited

U.S. PATENT DOCUMENTS

| | | | |
|---|---|---|---|
| 3,442,435 A * | 5/1969 | Ludder et al. | 220/528 |
| 4,478,346 A * | 10/1984 | Spong | 220/711 |
| 4,558,804 A | 12/1985 | Keck | |
| 4,582,218 A * | 4/1986 | Ross | 220/290 |
| 4,842,157 A * | 6/1989 | Stone-Parker et al. | 220/719 |
| 5,328,051 A | 7/1994 | Potter et al. | |
| 5,370,260 A * | 12/1994 | Paramski | 220/580 |
| 5,553,731 A * | 9/1996 | Schuyler | 220/719 |
| 5,588,561 A | 12/1996 | Ness | |
| 5,676,244 A | 10/1997 | Green et al. | |
| 5,676,275 A | 10/1997 | Khattar | |
| 5,706,980 A | 1/1998 | Dickerson | |
| 5,727,679 A | 3/1998 | Newarski | |
| 5,753,289 A | 5/1998 | Ness | |
| 5,971,202 A * | 10/1999 | Filbrun | 220/719 |
| 6,135,307 A * | 10/2000 | Fahy | 220/574 |
| 6,196,406 B1 | 3/2001 | Ennis | |
| 6,221,402 B1 | 4/2001 | Itoh et al. | |
| 6,248,363 B1 | 6/2001 | Patel et al. | |
| 6,254,907 B1 | 7/2001 | Galomb | |
| 6,528,105 B1 | 3/2003 | Gerhart et al. | |
| 6,641,854 B2 | 11/2003 | Gerhart et al. | |
| 6,913,777 B2 | 7/2005 | Rebhorn et al. | |
| 7,063,229 B2 | 6/2006 | Westerhof et al. | |
| 7,815,073 B1 * | 10/2010 | Fairchild | 222/129 |
| 8,485,378 B2 * | 7/2013 | Zoss et al. | 220/23.86 |
| 2002/0110622 A1 | 8/2002 | Lloyd et al. | |
| 2004/0200844 A1 * | 10/2004 | Watzke et al. | 220/501 |
| 2004/0200845 A1 * | 10/2004 | Watzke et al. | 220/501 |
| 2005/0172832 A1 | 8/2005 | Groenke | |
| 2006/0086755 A1 | 4/2006 | Roth et al. | |
| 2006/0086756 A1 | 4/2006 | Roth et al. | |
| 2006/0108022 A1 | 5/2006 | Carter et al. | |
| 2007/0221513 A1 | 9/2007 | Taylor-Sharp et al. | |
| 2008/0156817 A1 * | 7/2008 | Roseblade et al. | 220/713 |
| 2009/0311389 A1 | 12/2009 | Zoss et al. | |
| 2010/0003379 A1 | 1/2010 | Zoss et al. | |

OTHER PUBLICATIONS

Skopis, *Combination Container Kits*, "Lets get it together".

* cited by examiner

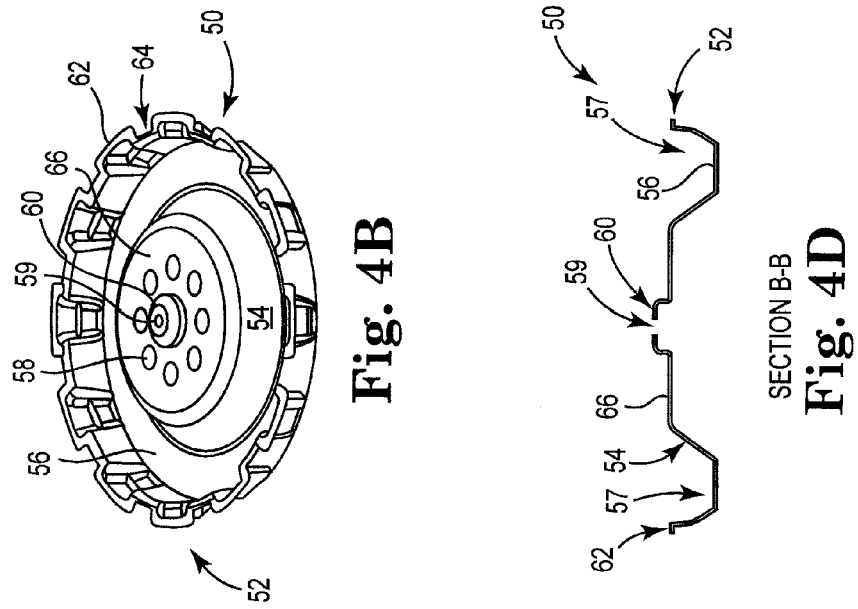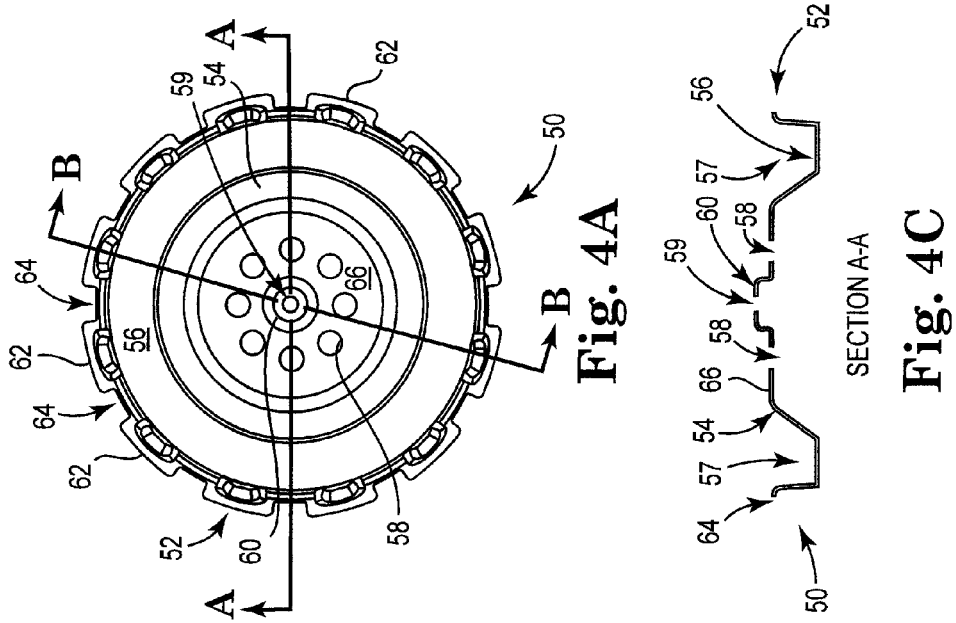

Section A-A

Section A-A

PACKAGES FOR DISPENSING LIQUID AND DRY FOOD

PRIORITY

This application is a continuation-in-part of U.S. application Ser. No. 12/384,709, filed Apr. 8, 2009, titled PACKAGES FOR DISPENSING LIQUID AND DRY FOOD; a continuation-in-part of U.S. application Ser. No. 12/456,015, filed Jun. 10, 2009, titled PACKAGES FOR DISPENSING LIQUID AND DRY FOOD, which claims priority to U.S. Application No. 61/131,508, filed Jun. 10, 2008, titled PACKAGES FOR DISPENSING LIQUID AND DRY FOOD; and a continuation-in-part of U.S. application Ser. No. 12/456,014, filed Jun. 10, 2009, titled PACKAGES FOR DISPENSING LIQUID AND DRY FOOD. The present application claims priority to all of the applications listed above and incorporates the contents of each of these applications by reference in their entireties herein.

FIELD OF THE INVENTION

The invention relates to food packages having features such as multiple containers in a single package; the packages can contain multiple food products including cereal and milk, or other dry and liquid food products, for consumption together in a convenient manner.

BACKGROUND

Breakfast is considered the most important meal of the day, but traditional "at home" breakfast eating occasions are declining. Mornings are rushed so consumers need on-the-go (e.g., portable) breakfast product solutions. A significant reason for skipping breakfast is not having the time to eat at home. A portable breakfast allows a person to take a serving of breakfast along, away from the home, and eat the breakfast at their morning destination or on the way to that destination.

One of the most common breakfast foods is dry cereal eaten with milk. By conventional methods, a dry cereal is placed in a bowl or other container and milk is poured over the cereal. The consumer consumes the milk and cereal together from the bowl using a spoon. This conventional mode of cereal consumption requires the user to remain stationary to consume the cereal from the bowl and is not an activity that can be safely performed while the consumer is mobile, such as by walking, riding, or driving a vehicle. Also, the serving of cereal is not portable for consumption upon arrival at a destination. Understood limitations of this basic mode of consuming cereal are that the combination of the bowl of cereal and milk is not mobile, and, therefore, the consumer must place the cereal and milk into the bowl in one location (normally a kitchen or eating area), and to also eat the cereal using a spoon in that same location.

To make breakfast a more convenient meal, manufacturers have offered breakfast bars, breakfast sandwiches, and other breakfast foods that can be consumed with a single hand and without preventing the person eating the food from moving from the location at which the food was prepared or purchased. There have also been attempts to construct a container that stores cereal and milk separately and allows the cereal and milk to be removed from a storage location (e.g., kitchen) or place of purchase, to be consumed at a later time or different location. Some of these containers are designed to allow the consumer to eat cereal and milk from a container using a single hand, optionally without having to be at a stationary position, but optionally while moving with the container while consuming the contents. These containers may provide mobility to the cereal eater, but past package designs have suffered from various shortcomings. For instance, past designs may not allow for dispensing a desired amount of milk relative to cereal, may not allow for controlled delivery of cereal, or may allow cereal and milk to contact each other and become soggy.

Various products have been developed to contain cereal and milk separately and then allow the cereal and milk to be mixed when consumed using a container that can be manipulated by one hand. Examples of such product configurations are illustrated and described at U.S. Pat. Nos. 5,588,561, 5,753,289, 6,528,105, and others. Such products show a single container that may hold cereal and milk in separate compartments of a single container, in a manner to allow the cereal and milk to be dispensed from the single container.

Continuing need exists for a cereal container that can contain milk and cereal together in a single package that allows a user to dispense cereal and milk using one hand.

SUMMARY

The following description relates to food packages and containers that can be useful to hold a dry food (e.g., dry cereal) and a liquid (e.g., milk), in separate containers within the same package, and to dispense the particulate food and liquid as a combined mixture. Packages having multiple containers that can contain cereal and milk are also described in Applicant's U.S. Provisional Patent Application Ser. No. 61/131,508, filed Jun. 10, 2008, titled PACKAGES FOR DISPENSING LIQUID AND DRY FOOD, and U.S. Ser. No. 12/384,709, filed Apr. 8, 2009, by Zoss et al., titled PACKAGES FOR DISPENSING LIQUID AND DRY FOOD, and in U.S. application Ser. No. 12/456,015, filed Jun. 10, 2009, titled PACKAGES FOR DISPENSING LIQUID AND DRY FOOD, and in U.S. application Ser. No. 12/456,014, filed Jun. 10, 2009, titled PACKAGES FOR DISPENSING LIQUID AND DRY FOOD, the entireties of which are incorporated herein by reference. Packages specifically described and illustrated herein include features also described in those copending applications.

The following description includes configurations for packages and containers for separately storing or containing, e.g., milk as a liquid and dry cereal as a dry food. Embodiments of packages allow the user to contain, store, or transport milk and cereal together and, at their convenience, combine the two for consumption at once as a mixture. Certain package configurations fit into consumers' busy lifestyles by enabling a consumer to eat their favorite cereals and milk while on the go, or to transport a single serving of cereal and milk to a location away from a point of purchase or storage (e.g., kitchen). Embodiments of product configurations allow for cereal consumption with little to no preparation, primarily requiring the consumer to grab a combined cereal and milk package, and go, optionally by adding milk, cereal, or both for consumption; according to different embodiments a consumer may eat upon arriving at their destination, or along the way. Certain embodiments provide better performance relative to past configurations for packages that include cereal and milk.

While the description exemplifies milk and dry cereal as being contained in and dispensed from described packages, other forms of food will also be useful with packages as described. Certain package configurations allow for a particulate food and the liquid to be contained, stored, transported, and optionally sold or delivered, together, then consumed being dispensed from the package as a mixture. The packages are particularly useful for storing and allowing consumption of breakfast in the form of dry ("ready-to-eat") breakfast cereal, with milk.

Exemplary packages allow a consumer to eat a mixture of cereal and milk with just a single hand, while in motion. Exemplary products can either be a complete offering supplying cereal and shelf stable milk, or may in the form of a package that contains cereal and no milk, but permits the user to supply their own serving of milk. For example, because a package can contain cereal and milk separately, a package that contains cereal can be prepared, stored, shipped, and sold together with or separately from a package that contains milk; the package that contains cereal can be combined with milk by pouring the milk into the upper container, upon which the milk will flow through the upper container (which may contain the dry cereal) and into the lower container. The milk and cereal remain separate until the consumer is ready to consume the cereal and milk together.

Exemplary packages can contain an upper container and a lower container as part of a single package. A divider can be located to separate the upper container from the lower container, the divider being one embodiment of and functioning as the upper container bottom. An exemplary package can be constructed using a single, integral vessel that defines sidewalls of both the lower container and the upper container, e.g., upper container sidewalls and lower container sidewalls can be integral to the vessel. A divider can be located at an interior location of the vessel to define a bottom of the upper container while allowing fluid communication between the upper container and the lower container and supporting dry food (e.g., cereal) and optionally an amount of liquid food (e.g., milk) within the upper container during use. Various forms of dividers can be useful, including dividers that include surfaces having forms in three-dimensions, various patterns of apertures for allowing fluid flow between an upper container and a lower container, and edges with recessed and extended sections to allow passage of fluid around the perimeter of the divider, between the divider and the vessel sidewall. Embodiments of dividers can allow for "omni-directional" dispensing of fluid by including passages (apertures or other spaces) distributed at or near a perimeter of the divider. Dividers can also include apertures for venting of gas as liquid passes from the lower container through the upper container by tipping, or for venting of gas as liquid is poured into the upper container and flows from the upper container, through the divider, and into the lower container.

A package may exclude a cover and can function by dispensing cereal and milk through an upper or top opening at the top of the vessel. Alternately a package can include a cover placed over the upper container. The cover can include a cover opening through which contents can be delivered. A cover may be flat and can preferably be three-dimensional. Advantageously, a three-dimensional cover can improve the ease with which a consumer can dispense cereal and milk from a package such as by causing a predetermined amount ("dose") of cereal to be dispensed from a package, followed by bridging to interrupt flow of cereal, during a single tip of the package.

Another optional feature of a package, at a divider, can be a reservoir at a bottom of a divider that can retain milk in an upper container during use. A reservoir can be a volume at an interior space of an upper container, optionally, below passages (e.g., apertures or spaces) that allow fluid communication between the upper container interior space and a lower container interior space. A reservoir may involve a three-dimensional bottom, and may also involve placement of a venting aperture at a location other than a bottom, such as at an elevated location. Upon tipping a container, milk can be caused to flow from the lower container into the upper container. When un-tipped back to vertical an amount of milk not dispensed to a user will fall to the bottom of the upper container and drain back into the lower container. An optional reservoir in the upper container can retain an amount of milk in the upper container for use in consuming cereal from the upper container. For example, cereal can more easily be caused to flow to an opening at the top of the upper container, if cereal pieces float on the top of an amount of milk. Milk contained in a reservoir at a bottom of an upper container can initiate flow of cereal to the top of the upper container upon tipping the package.

Packages as described can be used to deliver cereal and milk in the same manner as a beverage dispenser (e.g., a can or bottle such as used for carbonated beverages) by dispensing a mixture of cereal and milk by tipping the container to cause the contents to empty from the top of the package into a user's mouth. (As used herein, a package is considered to be tipped "forward" by tipping a front side of a top of the package in a direction toward the user, with the front side being a side of the package that dispenses cereal and milk and that is generally held toward the user.) According to embodiments of the described packages, a combined mixture of dry cereal and milk, optionally in desired amounts or combinations of amounts, can be delivered directly to a user's mouth.

As used herein, the terms "above" and "below" are used in a conventional manner to indicate a location of one feature of a package (above or below, i.e., higher than or lower than) relative to another feature, when the package is held vertically, unless otherwise indicated.

In one aspect the invention relates to multi-container package that includes: a lower container comprising a lower container interior space defined by a lower container bottom and lower container sidewalls; an upper container located above the lower container, the upper container comprising an upper container interior space defined by an upper container bottom and upper container sidewalls, and capable of containing food product; a passage between the lower container interior space and the upper container interior space that allows liquid to flow between the lower container interior space and the upper container interior space; and a vent that allows pressure to equalize in the lower container interior space as liquid flows between the lower container interior space and the upper container interior space. The upper container sidewalls and the lower container sidewalls are integral sidewalls of a vessel and the package can be tipped in at least one direction to cause liquid to flow into the upper container interior space to contact food product within the upper container interior space, and the package can be tipped in the same direction to simultaneously dispense liquid and food product.

In another aspect the invention relates to a multi-container package that includes an upper container interior space and a lower container interior space separated by a divider. The package includes: a bottom; sidewalls extending from the bottom to a top; an opening at the top; and a divider comprising a perimeter engaged with the sidewall at a location above the bottom and below the top. The lower container interior space is defined by the bottom below, at sides by the sidewalls between the bottom and the divider, and by the divider above. The upper container interior space is defined by an upper container bottom comprising a divider, and at sides by the sidewalls extending from the divider to the top. The package includes a passage between the upper container interior space and the lower container interior space.

BRIEF DESCRIPTION OF THE FIGURES

FIG. 4A is a top view of a divider as described.
FIG. 4B is a top perspective view of a divider as described.
FIG. 4C is a side view of a divider as described.
FIG. 4D is a side view of a divider as described.

DETAILED DESCRIPTION

Figure 1:
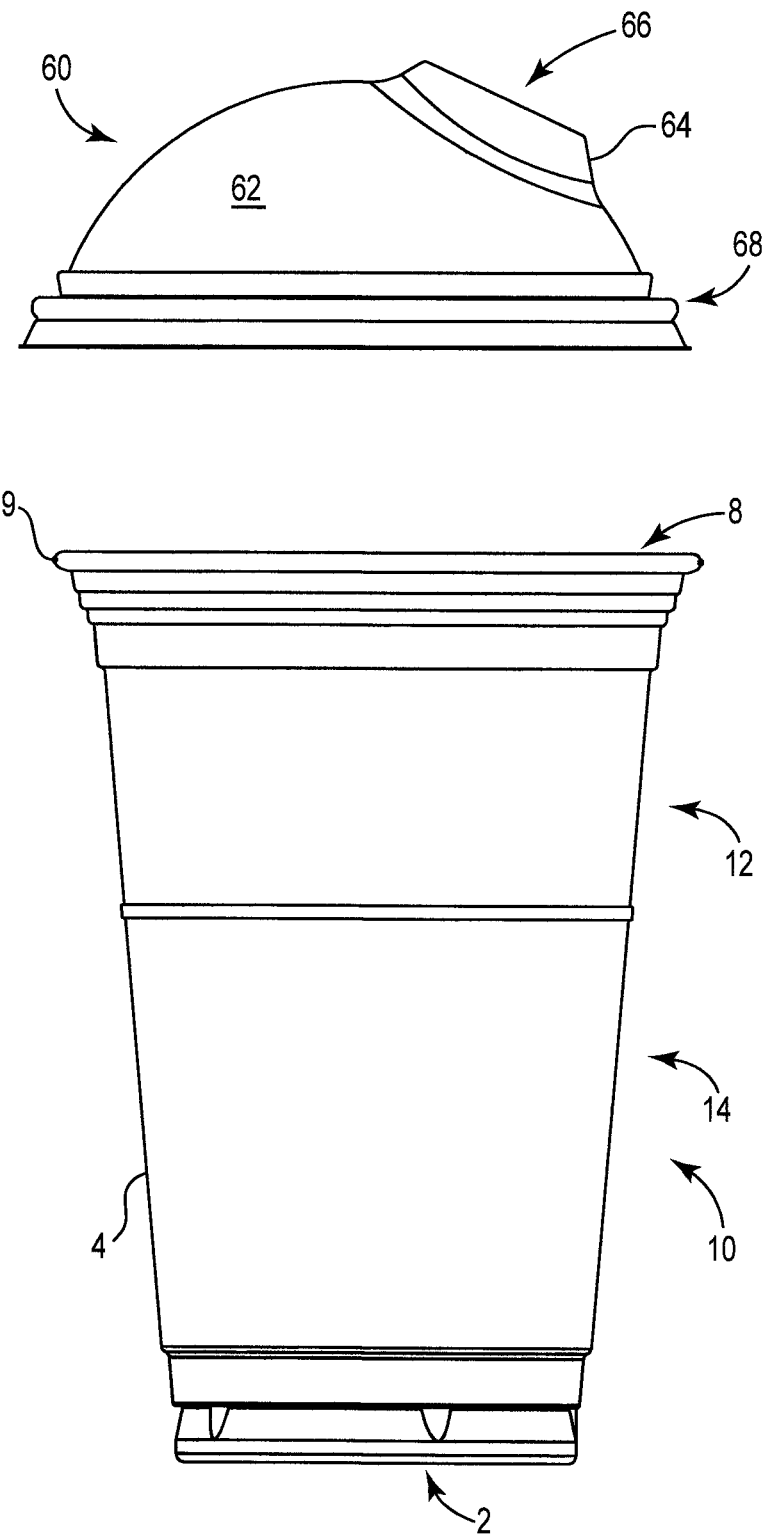
FIG. 1 illustrates a package as described.

Below are brief descriptions and sketches of exemplary configurations of packages for containing, storing, and dispensing dry food (e.g., cereal) and liquid (e.g., milk) for consumption. Embodiments of packages as described include separate containers for separately containing milk and cereal or other combinations of foods. Exemplary packages can allow a consumer to tip the container in a manner that causes contact between the dry food and the liquid, within the package, and while tipping in the same direction, dispense the foods, e.g., milk and cereal, together as a mixed stream directly into the consumer's mouth. Certain embodiments allow tipping in a single direction, e.g., a front direction toward a user, to cause contact between the dry food and the liquid as well as dispensing of the food and liquid. Certain other embodiments allow tipping in multiple different directions or in any direction (omni-directional tipping) to cause contact between the dry food and the liquid as well as dispensing of the food and liquid.

In certain embodiments, cereal and milk are contained separately in two containers of a single package, an "upper" container (sometimes otherwise simply referred to as a "container" or as a "cereal" container) that is located above a "lower" container, and a lower container that is below the upper container. The upper container is separated from the lower container by a bottom of the upper container, such as in the form of a divider the defines a bottom of the upper container and lies between the upper container and the lower container. One or more passages between the upper and lower containers allow for fluid communication between the upper container and the lower container, including passage of liquid between the lower container and the upper container (by tipping the package) whereby the liquid can contact the contents (e.g., cereal) of the upper container.

Exemplary packages include a lower container that contains a lower container interior space defined by a lower container bottom and lower container sidewalls. An upper container is located above the lower container and includes an upper container interior space defined by an upper container bottom and upper container sidewalls. The upper container bottom can be a bottom integral to upper container sidewalls, or separate, such as a separate divider. The upper container bottom can have features of apertures, three dimensions, a reservoir, etc., as discussed with regard to exemplary upper container bottoms in the form of dividers.

One or more passages can be present between the lower container interior space and the upper container interior space to allows fluids (liquid and air) to flow between the lower container interior space and the upper container interior space. An example is a passage at a front of a package, between the upper container interior space and the lower container interior space, that allows liquid to pass from the lower container interior space into the upper container interior space where the liquid contacts the contents of the upper container interior space when the package is tipped toward the front of the package. Another example is a vent optionally at a back or a central location of the package, that allows pressure to equalize in the lower container interior space as liquid flows between the upper container interior space and the lower container interior space, e.g., when the package is tipped toward the front of the package.

A lower container can include a bottom and lower container sidewalls that extend generally upward toward the upper container. The upper container can include a bottom and upper container sidewalls. Lower container sidewalls can be integral with upper container sidewalls; i.e., the upper container sidewalls and the lower container sidewalls can be integral sidewalls of a single vessel. For example, a bottom of a bottom container, bottom container sidewalls, and upper container sidewalls, can be part of a single vessel that forms upper container sidewalls and lower container sidewalls of a multi-container package as described, the vessel sidewalls being of a single, integral, continuous structure such as sidewalls of a plastic, glass, or styrofoam cup, glass, or other such container. Upper container sidewalls and lower container sidewalls that are considered to be "integral" (with each other) are not formed of two or more separate pieces secured by mechanical (threads, snap-fit, etc.) or other type of securing mechanisms that can be separated and re-connected at a boundary between upper container sidewall and lower container sidewall, such as at or about the upper container bottom.

An example of a vessel for use in the package, having integral sidewalls, is a glass or a cup having sidewalls formed of a continuous, integral wall material that cannot be mechanically separated and re-connected multiple times along a joint (for example a threaded engagement, friction-fit engagement, a spring-loaded engagement, a snap-fit engagement, or the like) located near an upper container bottom or a divider of the package. Vessel sidewalls can typically be circular in cross section, e.g., cylindrical or cylindrical with an outward slant, but may alternately be of other shapes such as oval, square, rectangular, etc. Exemplary vessels can be made of plastic, styrofoam, paper, cardboard, metal, ceramic, and similar materials that form containers having a bottom and sidewalls extending from the bottom in a vertical, generally vertical, or slanted-vertical direction, to a top of the sidewalls to form an opening at the top of the vessel. The vessel, and the package described herein, may be re-usable or disposable. Examples of useful vessels (cups or glasses) are commercially available in various sizes as item brands that include: Dart™, Dixie™ from Georgia Pacific, Ecotainer™ from International Paper, Solo™, BWK™, and others.

FIG. 1 illustrates an example of a vessel in the form of a plastic, paper, cardboard, or styrofoam, cup or glass 10 having bottom 2, top edge (with upper lip) 9, top opening 8, and sidewalls 4 extending between bottom 2 and top edge 9. The volume of vessel 10 can be a combined volume of a lower container and an upper container. Sidewalls 4 are formed of a single piece of wall material and include an upper region 12 capable of defining an upper container sidewall, and a lower region 14 capable of defining a lower container sidewall, integrally formed and not designed to be mechanically separated and reconnected.

Exemplary packages according to the present description can include a divider disposed at the interior of the package between the top and the bottom of the package. A divider includes a perimeter and divider surfaces that extend within the perimeter, including an edge or other perimeter surface capable of engaging vessel sidewalls at an interior of the package. A divider can function as a bottom of an upper container to support the contents of the upper container. One or multiple passages can be located at the upper container bottom to allow fluid communication between the upper container and the lower container. A passage can be of any useful form, such as an opening or aperture in a surface of a divider or an upper container bottom, or as a space (aperture, passage, channel, or the like) between a divider on an upper container bottom and a sidewall.

Examples of dividers can be in the form of a separate piece (e.g., "insert") of a package inserted into a vessel and secured to sidewalls at an interior of the package to divide the upper container from the lower container. The divider can be secured to sidewalls by any useful mechanism, such as by a mechanical (e.g., snap-fit) engagement, an adhesive, friction, mechanical or chemical bonding, etc. For example, a perimeter or edge of a divider can include vertical, rounded, or slanted surfaces (e.g., a flange, lip, bead, or corner, etc.) that align with or engage an interior sidewall of a vessel or a corresponding (opposite) surface, and these surfaces can be secured by a frictional engagement, or alternately or additionally bonded by adhesive, thermal treatment, ultrasonic welding, or other frictional, mechanical, or chemical bonding mechanism. Exemplary dividers can include a perimeter and divider surfaces extending within the perimeter, with the perimeter including an edge capable of engaging the interior vessel sidewalls in a frictional (e.g., locking or snap-fit) arrangement. Other optional features include apertures or openings located at various locations on surfaces of the divider, or spaces (notches, recesses) at a perimeter of the divider that create passages between the divider and a sidewall when the divider is placed into a vessel.

A divider (or upper container bottom) can optionally include one or more apertures to allow passage of gas (air) and liquid (milk) when the package is tipped. Multiple apertures may be on opposite sides of the divider (or upper container bottom) and at or near a perimeter (e.g., on an outer third of a divider as measured by radius or distance from center to a perimeter at the location of the aperture); these apertures may allow flow of air and liquid (e.g., milk) when tipping a package. Another type of aperture may be located at an inner third of a divider (as measured by radius or distance from center from center to a perimeter in the direction of the aperture), and may optionally be at an elevated location relative to a bottom of a divider, such as at a top of a three-dimensional peak rising from a bottom of the divider or relative to other passages; these interiorly-located apertures may function to allow milk to be poured into the upper container interior space and pass through a passage between the upper container interior space and the lower container interior space, e.g., through and in contact with breakfast cereal or another food product contained in the upper container interior space.

Additionally or in combination with apertures a divider perimeter can include notches, recesses, or other edge features, that create a passage between an upper container and a lower container when the divider is placed within a vessel. A series of notches or recesses around a divider perimeter (e.g., uniformly spaced) can be intermittently and uniformly located, resulting in passages distributed around the perimeter of a bottom of an upper container of a package to allow milk to flow from the lower container interior space into the upper container interior space, e.g., to contact cereal in the upper container interior space, by tipping the package in any direction. Passages uniformly distributed around the upper container bottom can allow for omni-directional tipping of the package to allow liquid to pass into the upper container interior space while simultaneously venting the lower container interior space.

A passage (e.g., aperture in a divider or space between a divider perimeter and vessel sidewall) allows for flow of milk from a lower container interior space into an upper container interior space. The amount of milk (i.e., milk flowrate) that flows through a passage can be controlled by factors that include the size of the passage. A milk flowrate can be any useful rate. Preferred milk flowrates upon tipping a package, from a lower container to an upper container, may be, e.g., a volume of 200 cubic centimeters of milk flowing from a lower container into an upper container in a time in the range from 5 to 25 seconds, more preferably in a time in the range from 12 to 15 seconds. Preferred passages can be sized to achieve a flowrate in this preferred range.

Another optional feature of a divider (or an upper container bottom) is a reservoir formed at the bottom of a divider to retain an amount of liquid (e.g., milk) to assist in dispensing a dry food product such as cereal from the upper container. A reservoir can include a space (i.e., volume) located at a bottom of a divider that does not allow flow of liquid through the bottom and into the lower container, but that can contain an amount of liquid in the upper container interior space for use in dispensing food product (e.g., cereal). The reservoir can be of any volume and shape, and in certain embodiments can be of an annular or partially annular shape that reflects a shape of a perimeter of a package that includes generally cylindrical sidewalls. A reservoir having an annular shape may include a flat bottom, a partially flat bottom, or a curved or rounded bottom. According to various embodiments, a reservoir can be of a volume sufficient to contain enough milk to facilitate removal of pieces of cereal. Exemplary volumes can be in the range from, e.g., 3 to 30 cubic centimeters, such as from 15 to 25 cubic centimeters or from 18 to 20 cubic centimeters.

Figure 2A:
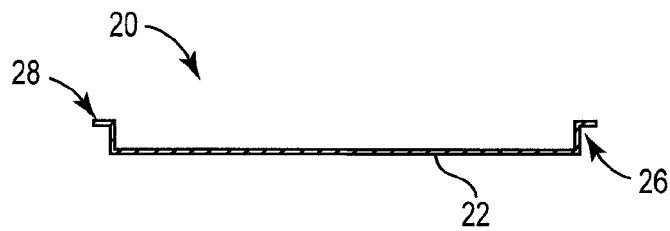
FIG. 2A is a side view of a divider as described.
Figure 2B:
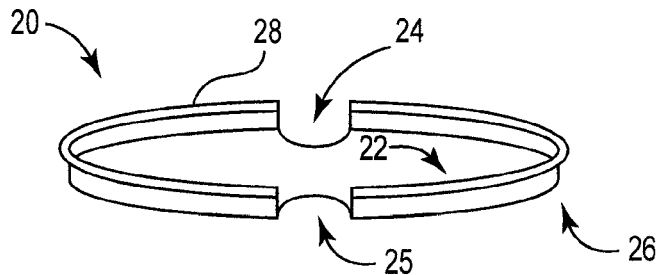
FIG. 2B is a side perspective view of a divider as described.
Figure 2C:
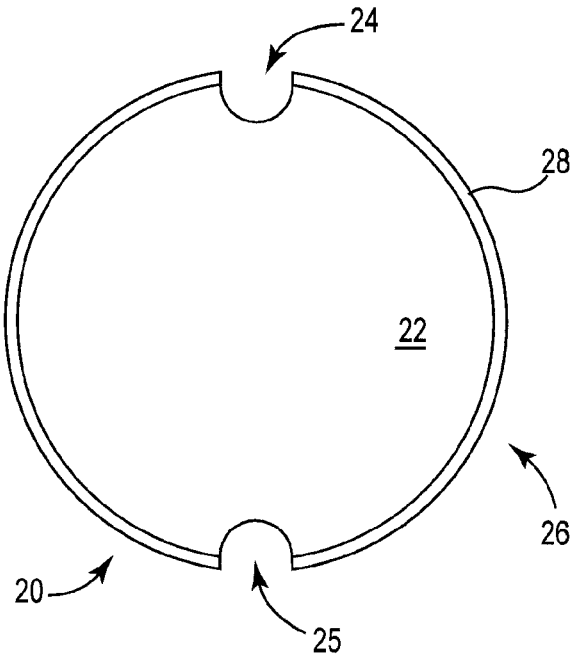
FIG. 2C is a top view of a divider as described.

FIGS. 2A, 2B, and 2C illustrate a divider for use in a vessel such as that of FIG. 1. Divider 20 is a generally planar disc-shaped insert that can be placed at an interior of a vessel and that engages sidewalls to divide the vessel into an upper container above the divider and a lower container below the bottom, and also to function as a bottom of the upper container. Divider 20 includes planar bottom 22, which is flat and includes no apertures or holes, but does include notches 24 and 25 for placement at a front and a back of a vessel. Perimeter 26 includes mechanical engagement 28 capable of engaging a vessel sidewall. As illustrated, mechanical engagement 28 is a lip extending laterally at perimeter 26 around most of perimeter 26. When placed horizontally in a vessel to engage vessel sidewalls, divider 20 serves as a bottom of an upper container and supports contents of the upper container. Notches 24 and 25 create two passages on opposite sides of a vessel, between the upper container interior space and the lower container interior space, allowing fluid (gas or liquid) to pass between the upper container interior space and the lower container interior space when the package is tipped toward notch 24 or 25. Also, when milk is poured into the top of the package (e.g., through an upper container interior space that contains cereal) the milk can flow through the upper container interior space and through passages 24 and 25, into the lower container interior space. When the package is tipped with milk contained in the lower container and cereal in the upper container, milk can pass through one passage (e.g., 24) from the lower container interior space into the upper container interior space, while the other passage (e.g., 25) allows for venting of air to equalize pressure in the lower container interior space. Optional features of a divider that can be included as features of divider 20 but that are not illustrated include apertures or holes in surfaces the divider, three-dimensional structure at surfaces of the divider such as a peak or a reservoir, and other features as described.

Figure 3:
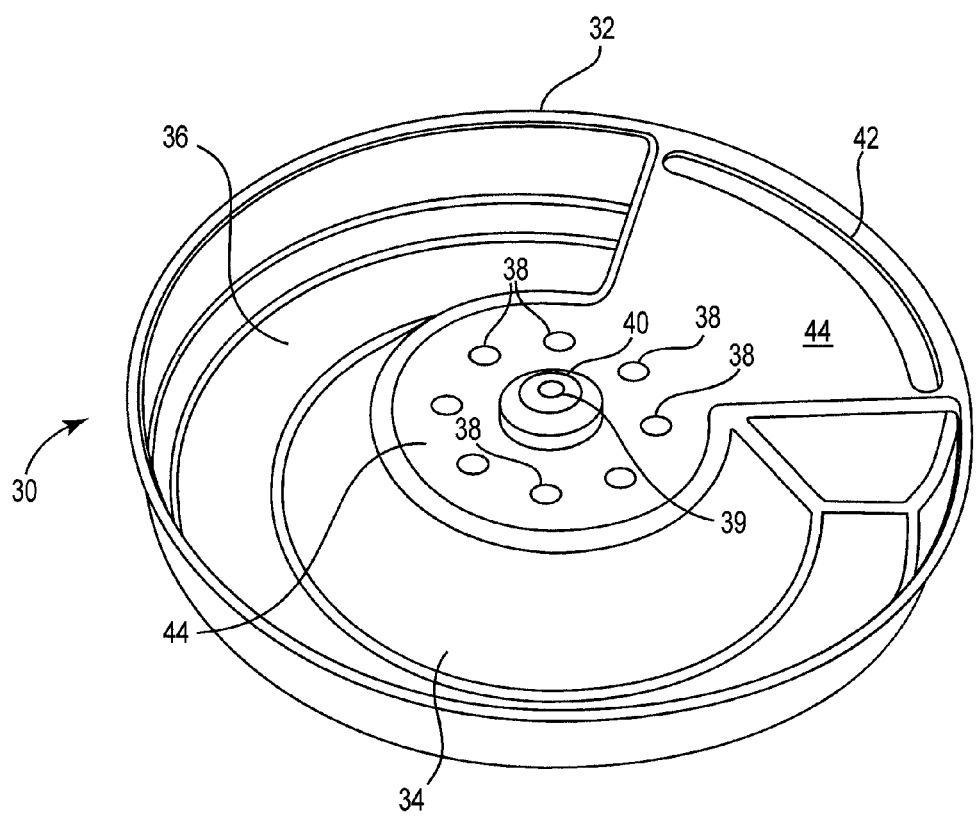
FIG. 3 is a top perspective view of a divider as described.

FIG. 3 illustrates another embodiment of a divider. Divider 30 includes perimeter 32 and three-dimensional divider surfaces that include round-pyramidal surface (or circular ramp) 34, annular bottom 36 of a reservoir, upper flat surface 44, and central surface 40 raised from upper flat surface 44. Central apertures 38 are at an inner one-third of divider 30 by radius. Aperture 39 is located on surface 40, which is elevated relative to central apertures 38 located at upper flat surface 44. Apertures 38 and 39 work together to allow milk to be poured through divider 30 by flowing through apertures 38, while raised aperture 39 is available for venting and pressure equalization. Perimeter 32 can include an edge that is capable of engaging an interior surface of a vessel to secure divider 30 at a location within the vessel to serve as a bottom of an upper container.

FIGS. 4A, 4B, 4C, and 4D illustrate another exemplary divider. Divider 50 includes perimeter 52 and three-dimensional divider surfaces that include round-pyramidal surface (or circular ramp) 54, annular (and flat) bottom 56 of reservoir 57, upper flat surface 66, and central surface 60, which is raised relative to upper flat surface 66. Central apertures 58, formed in upper surface 66, are at an inner one-third of the divider by radius. Aperture 59 is located on surface 60 at a center of divider 50. Perimeter 52 includes multiple extended edge segments 62 capable of engaging interior vessel sidewalls, and multiple recessed segments 64 (or notches) between extended edge segments 62. When divider 50 is placed at an interior of a vessel, extended segments 62 and recessed segments 64 together form multiple passages at recessed segments 64, between divider perimeter 52 and sidewalls of the vessel. The passages allow fluid communication between the upper container and the lower container. Recessed segments 64 are distributed at multiple locations around perimeter 52 so that when divider 50 is placed in a vessel, the package can distribute milk and cereal by omnidirectional tipping; i.e., the vessel can be tipped in any direction to allow milk to pass from a lower container into an upper container through one or more front passages, while air flows into the lower container through passages on an opposite side of the divider (at the back of the package) to equalize pressure. Any of the passages can function as a passage for either milk flow or flow of air.

Various package embodiments can include a cover that can cover (partially or completely enclose) an upper container. A cover can extend over the top of the upper container and may be of any useful form such as flat or three-dimensional and can include a cover opening or a notch at an edge or surface that opens to the upper container to allow dispensing contents of the package through the cover opening. A cover opening can optionally be covered by any form of closing mechanism such as a cover cap, a removable tab, a screw cap, a snap-fit cap, or any other type of closing mechanism. A cover and closing mechanism can be made of plastic, paper, cardboard, metal, foil, etc.

Certain embodiments of covers can include a three-dimensional form. A three-dimensional cover can take any three-dimensional form or shape that defines a space ("coverspace") within the three-dimensionally formed cover, at a top of the package, such as a domed shape or a modified domed shape—e.g., a rounded dome, a dome of connected curved or flat surfaces that meet at corners or angles, or any other form of a dome. A cover opening can be located at a surface of a three-dimensional cover and optionally can be connected by an extension or a spout that extends away from a cover surface to allow a user to place a portion of the spout and the cover opening into the mouth. The cover opening can have a profile that is round, oval, square, football-shaped, or any other shape that will facilitate deliver of contents of a package to a user.

A three-dimensional cover can define added interior space within the upper container and can improve the ease with which a consumer can dispense cereal and milk from a package, for instance by improving the flow of cereal from the package. Certain embodiments of packages involve a "dose" control feature that causes a predetermined amount of cereal to be dispensed from a package each time the package is tipped. Upon tipping a package to dispense cereal and milk, an amount of cereal (combined with milk) passes through a cover opening such as of a three-dimensional cover. A cover and upper container can be sized and shaped to allow a certain amount of cereal (dose) to pass followed by bridging of the cereal, which stops to the flow of cereal (not necessarily milk). Dose volume and bridging of cereal can be affected by features of a package including one or combinations of the total volume and specific dimensions of the upper container interior space, volume and size of a cover (e.g., a cover formed in three dimensions), size of a cover opening, dimensions (e.g., height and diameter) of an upper container, dimensions (height and diameter) of a domed cover, and ratios of dimensions such as a ratio of a domed cover height per diameter of an upper container.

The amount, rate, or amount and rate of cereal delivery can also be affected by the size and density of the dry cereal pieces. The size of cereal pieces can be selected to cause a desired flow or flow rate through a cover opening for delivery, optionally and preferably to also create a cereal "bridge" to interrupt cereal flow even while the package remains tipped. For example, a package can be designed to result in the formation of a cereal bridge to stop cereal flow through a cover opening after a desired amount (one "dose") of cereal is dispensed. The size of a cover opening that results in formation of a cereal bridge can depend at least in part on the size of cereal particulates (pieces). Larger cereal particulates require a larger opening to allow a desired dose delivery followed by formation of a cereal bridge. An opening size may be selected to allow a desired or predetermined volume of cereal that is approximately one heaping teaspoon (alternately, a volume equal to the volume of the cereal holding stage) to be dispensed to the user with each tip of the package, then for a cereal bridge to form and stop the flow of cereal. Exemplary dimensions of package features such as those mentioned can be sufficient to allow passage of a desired type of cereal such as a flake, a puffed cereal piece, etc., which may be relatively round (Trix™), square (Cinnamon Toast Crunch™), puffed and circular, (Cheerios™), etc., optionally with bridging to halt flow after a certain volume of cereal passes through the cover opening.

For a preferred dose of cereal, with each tip, a package can deliver a single spoonful of cereal along with a single spoonful of milk, e.g., from about 1.5 to 6 grams of cereal per tip, such as from 2 to 5 grams per tip, or from 2.5 to 3 grams of cereal per tip, followed by bridging. In terms of volume, preferred amounts may be from 10 to 40 cubic centimeters per tip, e.g., from 17 to 20 cubic centimeters per tip, followed by bridging.

An example of a range of preferred diameters of a cover opening, e.g., to achieve desired cereal flow and bridging, can be from 0.8 to 1.5 inches, such as from 1.3 to 1.5 inches; the diameter can be for a circular opening, an oval opening, or an opening of another useful dispensing shape. An oval cover opening may include a preferred major diameter in a range from 0.6 to 1.2 inches and a preferred minor diameter in the range of 0.8 to 1.5 inches. Preferred and particularly preferred areas of a cover opening (regardless of shape) can be in the ranges from 0.9 to 2.0 square inch and 1.3 to 1.8 square inch, respectively.

A range of preferred diameters of a cover and of a top opening of an upper container (an upper or top opening), e.g., to achieve desired cereal flow and bridging, can be, e.g., from 2.5 to 5 inches, such as from 3.8 to 4.5 inches.

In a package as described and having a domed cover, a ratio of the height of the dome (maximum dome height excluding a spout) relative to the diameter of a top opening of an upper container to can be selected to provide desired, predetermined dose control, including flow of cereal followed by bridging of cereal to halt flow through a cover opening. Larger ratios of dome height to top opening diameter can result in relatively greater cereal flow per tip and smaller ratios can result in relatively reduced cereal flow per tip. Any useful ratios are contemplated, with preferred ratios of dome height to diameter a top opening of an upper container being in the range of from 0.25 to 1, with ratios between 0.25 and 0.5 being particularly useful.

Referring to FIG. 1, cover 60 is a three-dimensional domed cover that includes rounded dome surface 62, spout (or extension) 64, and cover opening 66. Spout 64 and cover opening 66 are located at domed surface 62 at a median angular location between the top of the dome (maximum dome height, as illustrated, coincides with the center of the domed cover) and perimeter 68. Domed surface 62 is a three-dimensional structure that defines an interior space that covers and communicates with upper container 12 of package 10. Domed surface 62 is substantially rounded but may optionally include flat surfaces or bends or angles. Cover opening 66 may be, e.g., round, oval, or of any other useful shape. Lower lip 68 includes a mechanical engagement that snaps onto upper lip 9 of package 10 to produce a liquid-tight engagement that allows cover 60 to be placed, removed, and replaced as desired.

Figure 5B:
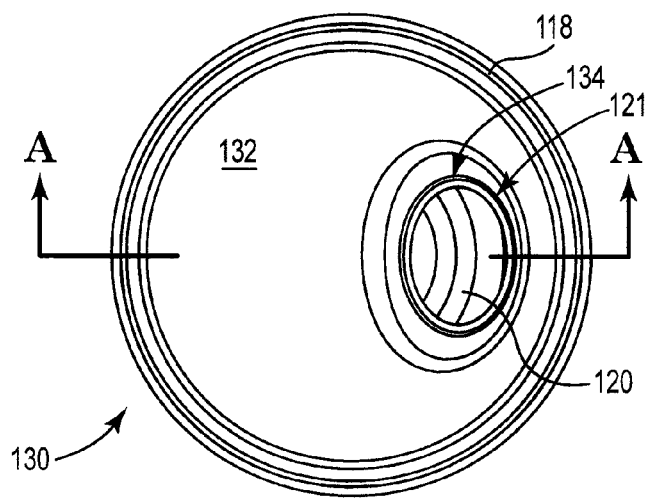
FIG. 5B is a top view of a package as described.
Figure 5A:
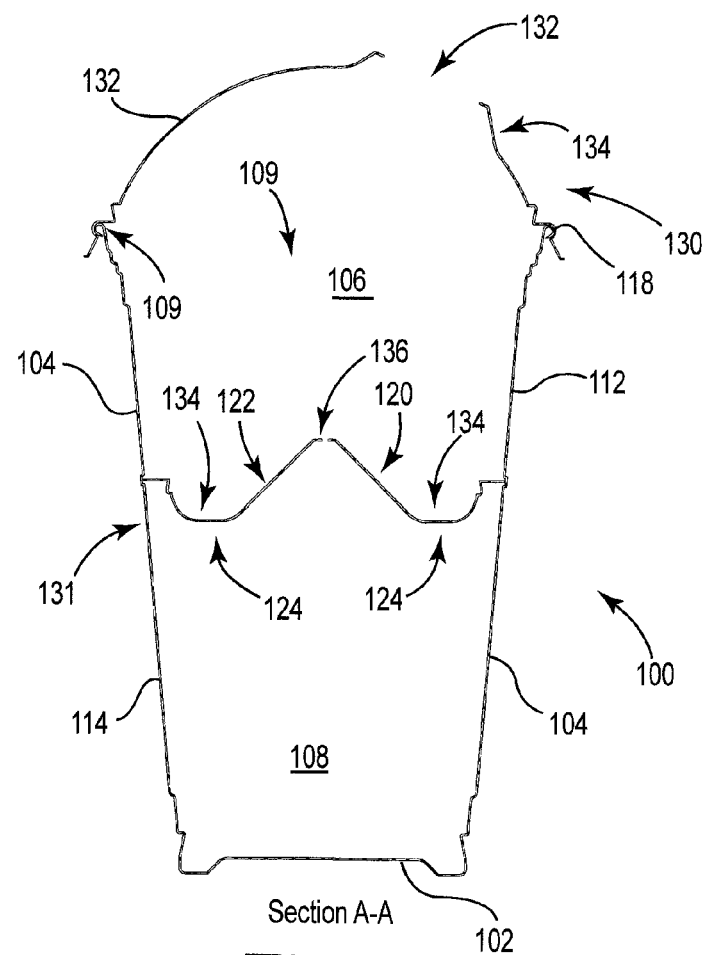
FIG. 5A is a side cut-away view of a package as described.
Figure 5C:
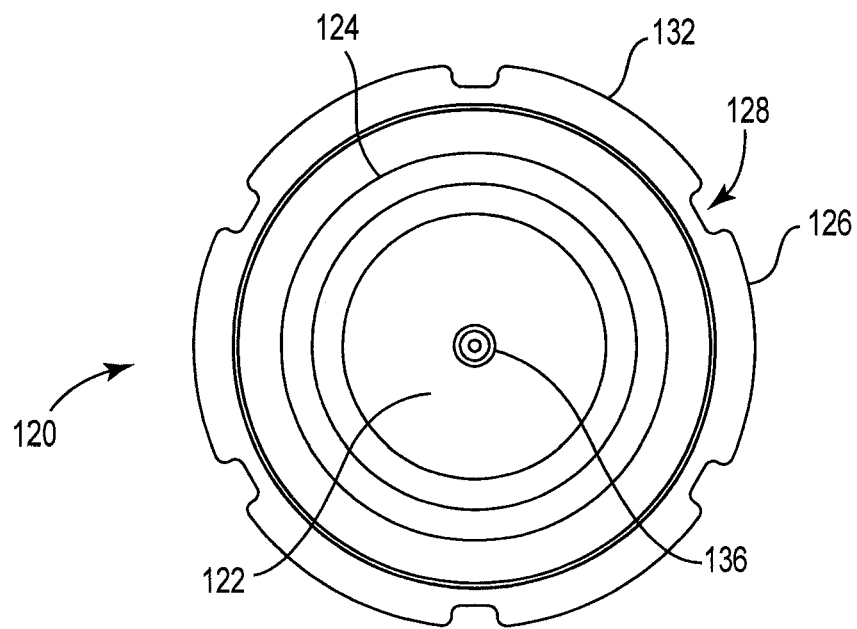
FIG. 5C is a top view of a divider as described.
Figure 5D:
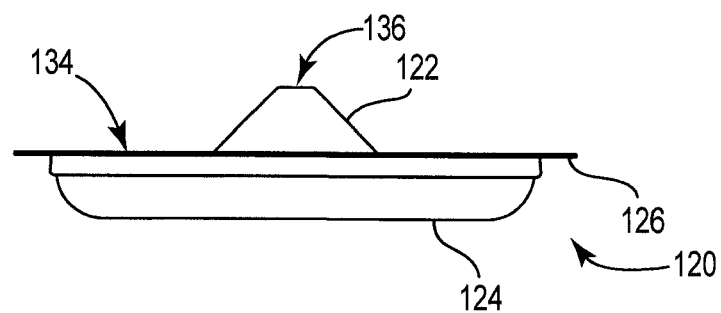
FIG. 5D is a side view of a divider as described.
Figure 5E:
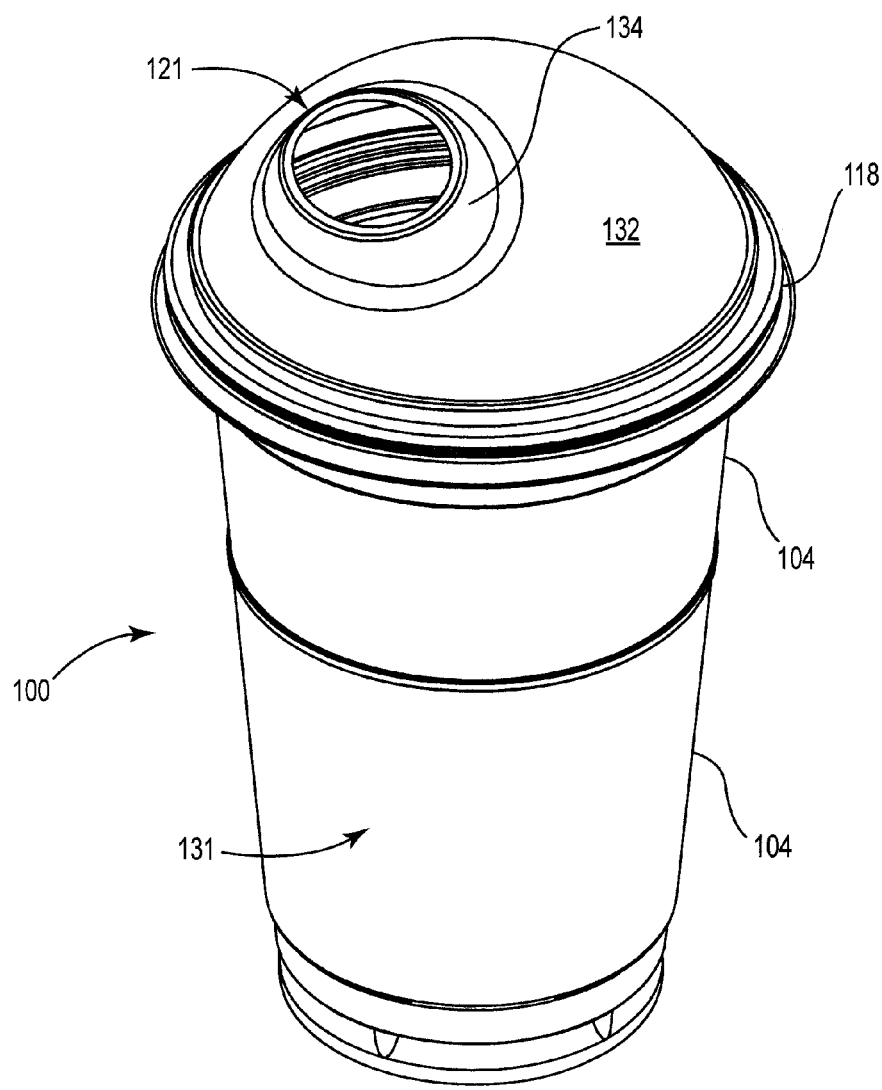
FIG. 5E is a perspective view of a package as described.

FIGS. 5A, 5B, and 5E illustrate examples of package 100 as described, having components that include vessel 131, divider 120, and cover 130. Vessel 131 can be a plastic, paper, cardboard, or styrofoam, cup, glass, or other container having bottom 102, sidewalls 104, top edge (with upper lip) 109, and top opening 109. The volume of vessel 131 is a combined volume of lower container 108 and upper container 106, which are separated by divider 120, also forming a bottom of upper container 106. Sidewalls 104 are formed of a single piece of material and include an upper region that defines an upper container sidewall 112 and a lower region that defines lower container sidewall 114, these being integrally formed and connected and not mechanically separable and capable of re-assembly.

Cover 130 is a three-dimensional domed cover that includes a rounded dome surface 132, spout 134, and cover opening 121. Cover opening 121 as illustrated is of an oval shape. Perimeter 118 includes a mechanical engagement that snaps onto upper lip 109 to produce a liquid-tight engagement that allows cover 130 to be placed, removed, and replaced as desired at the top of vessel 131 to cover top opening 109.

FIGS. 5C and 5D illustrate divider 120, which includes perimeter 126 and three-dimensional divider surfaces that include round-pyramidal surface (or circular ramp) 122, annular bottom 124 of reservoir 134, and aperture 136 at the peak of pyramidal surface 122. Aperture 136 is located at the peak of pyramidal surface 122 to elevate aperture 136 to a height (relative to vessel 131) that is above perimeter 126 and passages formed by segments 128.

Perimeter 126 includes multiple extended edge segments 132 capable of engaging the interior of vessel sidewalls 104, and multiple recessed segments 128. When divider 120 is placed at the of vessel 131, extended segments 132 and recessed segments 128 combine to form multiple passages at recessed segments 128 between divider 120 and sidewalls 104, around the perimeter of the bottom of upper container 106. The passages allow fluid communication between upper container 106 and lower container 108. Recessed segments 128 are distributed (e.g., uniformly) at multiple locations around perimeter 126 so that when divider 120 is placed in vessel 131, package 100 can distribute milk and cereal by omni-directional tipping; alternately described, divider 120 and cover 130 can both be secured to vessel 131 in any rotational orientations, and package 100 can be tipped in a direction toward cover opening 121 so that milk passes from lower container 108 into upper container 106, through one or more passages, while air flows into the lower container through passages on an opposite side of divider 120 (at the back of package 100) to equalize pressure.

Referring to FIGS. 6A through 6F, another embodiment of a package 100 is shown, this one including a alternate cover opening 121 and an alternate divider 150. Other features of package 100 of FIGS. 6A through 6F are similar or identical to package 100 of FIGS. 5A through 5E.

As shown at FIGS. 6B, 6C, 6D, and 6E, divider 150 includes perimeter 152 and three-dimensional divider surfaces that include round-pyramidal surface (or circular ramp) 154, annular bottom 156 of reservoir 158, and aperture 160 at the peak of pyramidal surface 154. Divider 150 also includes intermediate surfaces 162 and 164, located at a height between annular bottom 156 and perimeter 152. Front intermediate surface 162 includes aperture (or milk port) 168 through which milk can flow when package 100 is tipped in a front direction, toward aperture 166 and cover opening 121; back intermediate surface 164 includes slot (or vent) 166 through which air can flow to equalize pressure in lower container 108 as milk passes through aperture 168.

Figure 6A:
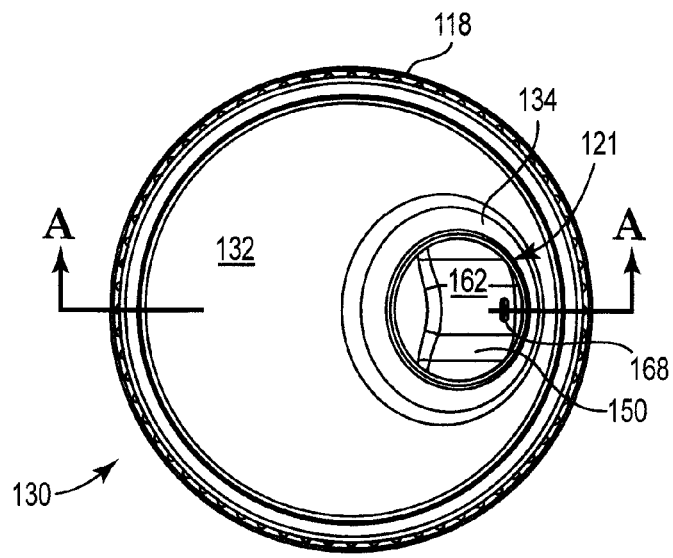
FIG. 6A is a top view of a package as described.
Figure 6B:
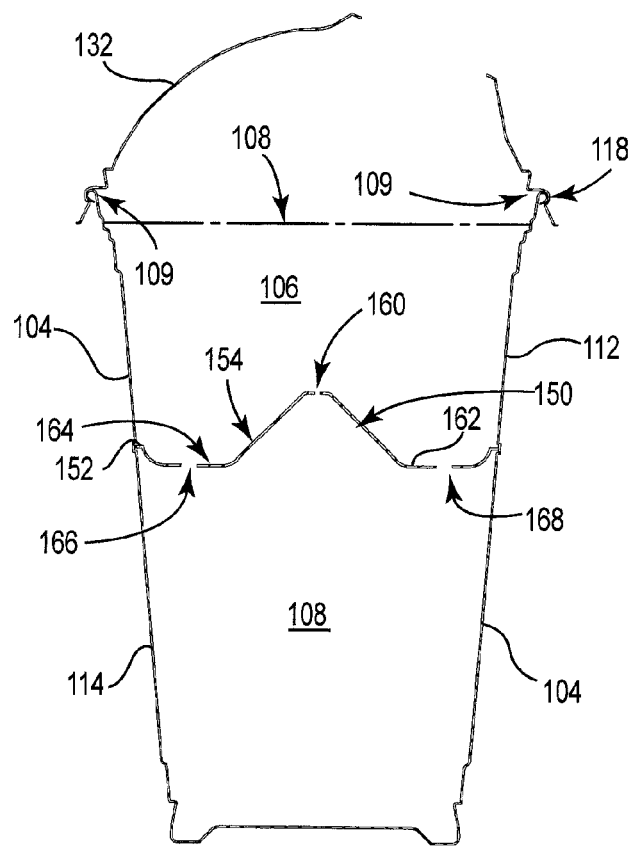
FIG. 6B is a side cut-away view of a package as described.
Figure 6C:
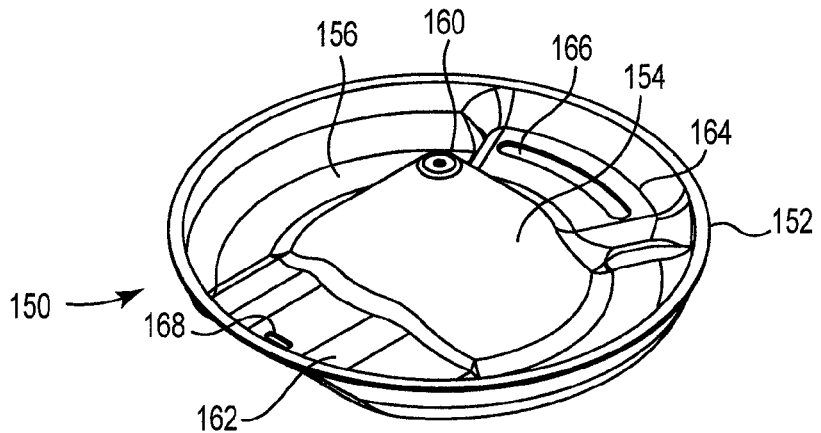
FIG. 6C is a perspective view of a divider as described.
Figure 6D:
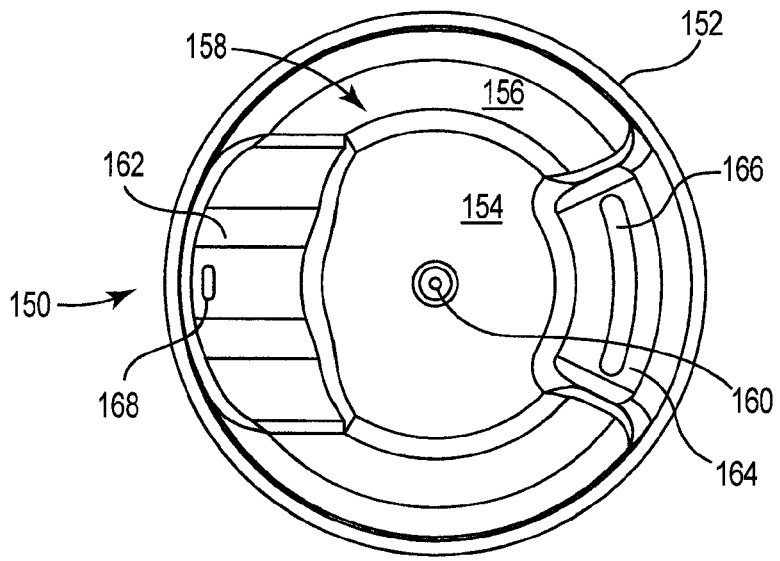
FIG. 6D is a top view of a divider as described.
Figure 6E:
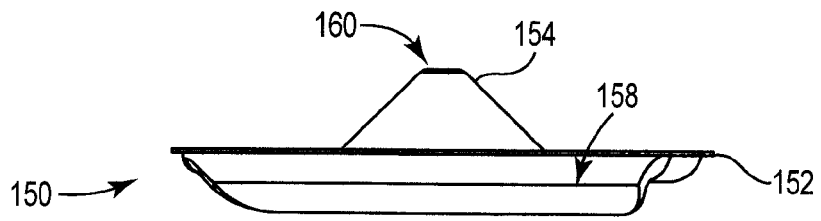
FIG. 6E is a side view of a divider as described.
Figure 6F:
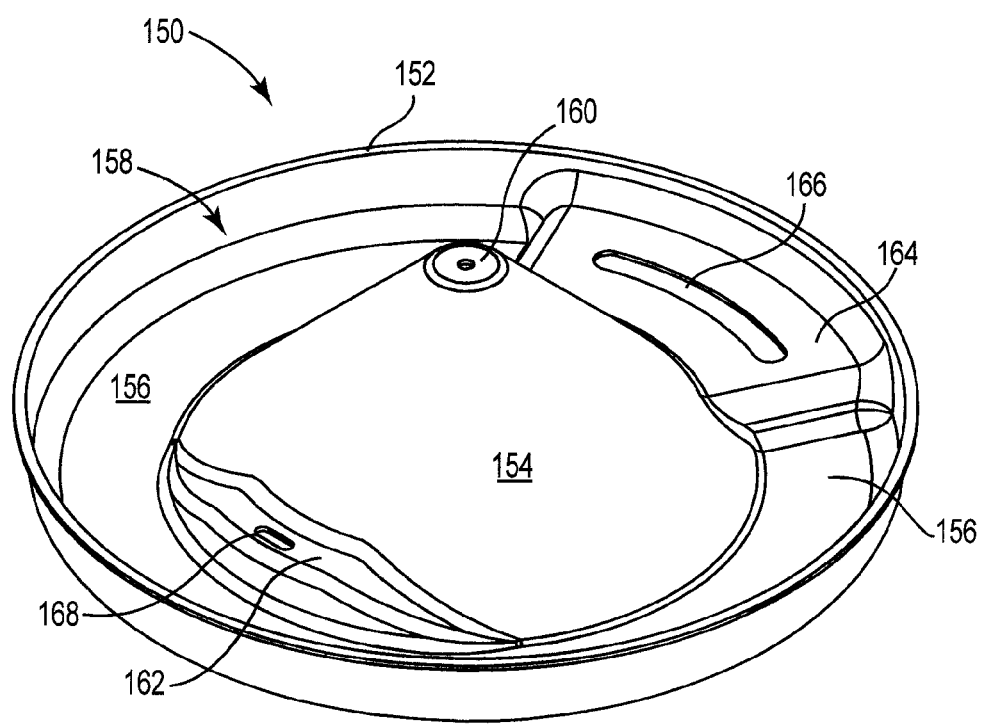
FIG. 6F is a perspective view of a divider as described.
Figure 6G:
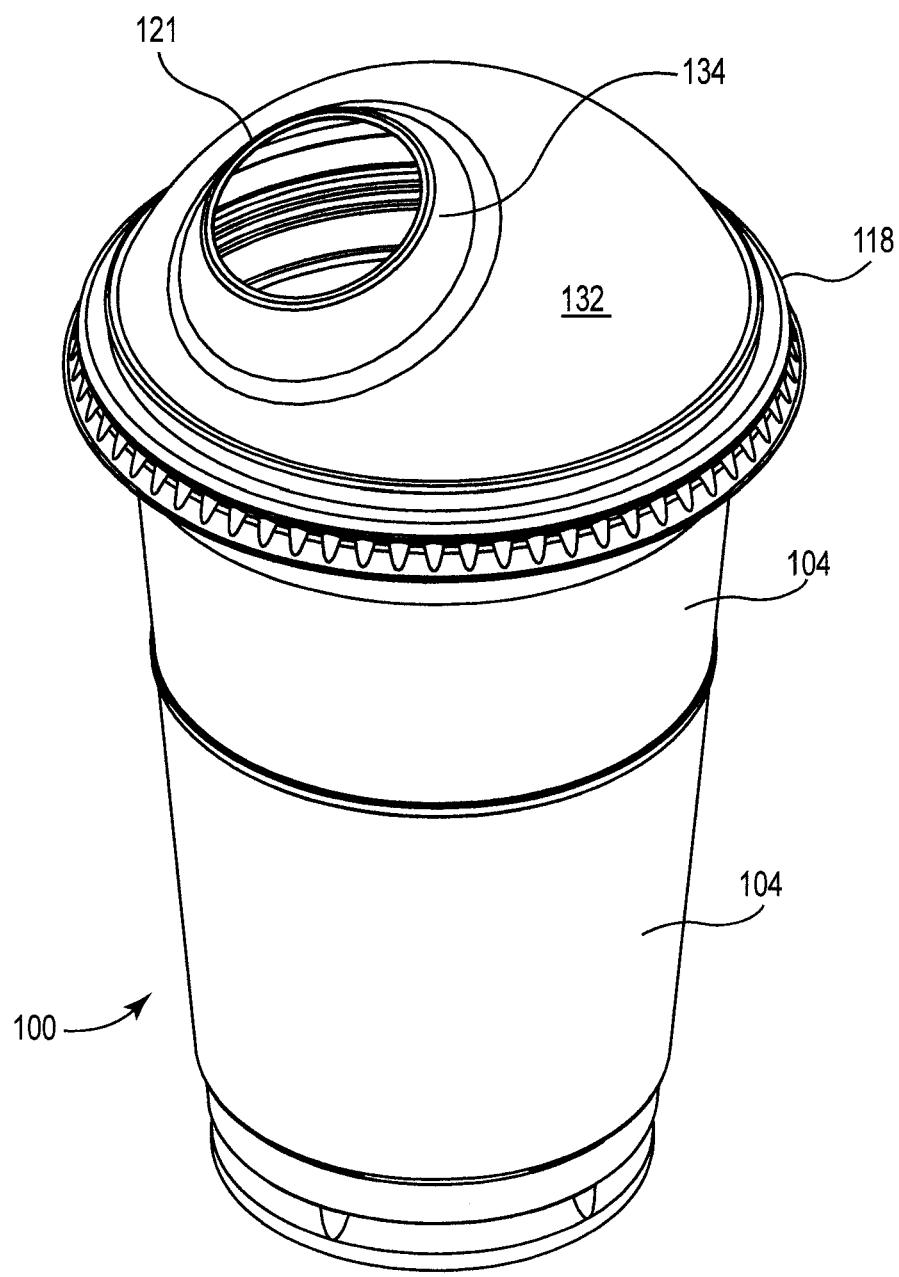
FIG. 6G is a perspective view of a package as described.

FIG. 6F shows a slightly modified divider, 150, with reservoir 158 and annular bottom 156 extending continuously around a substantial perimeter of divider 150, interrupted on a back side of divider 150 by intermediate surface 164. Intermediate surface 162 and aperture 168 are located at a base of pyramidal surface 154.

In use a package such as package 100 (from the various figures) can be used to dispense a combined flow of cereal and milk (or other dry food and liquid food combination). Lower container 108 can be useful to store or to contain milk. Upper container 106 can be useful to store or contain a solid (non-liquid) food product such as cereal, dry cereal, dry cereal particulates (e.g., breakfast cereal in the form of flakes or other pieces), etc. For example, package 100 can be used to store milk and breakfast cereal together, or breakfast cereal and no milk, or milk and no breakfast cereal. If package 100 stores milk and no cereal, cover 130 can be removed and cereal can be added to upper container 106 through top opening 108. If package 100 stores cereal and no milk, cover 130 can be removed and milk can be poured through opening 108, into upper container 106, through and in contact with cereal in upper package 106, through passages between upper container 106 and lower container 108 (e.g., apertures in divider 120), to be contained by lower container 108. A volume of milk may remain in an optional reservoir of divider 120 if a reservoir is present. Once cereal is contained in upper container 106 and milk in lower container 108, with cover 130 placed at top opening 108 around lip 109, cover opening 121 of package 100 can be tipped forward toward a user. Milk from an optional reservoir, and milk contained in lower container 108 that will flow into the upper container interior space, both contact cereal in upper container 106. A mixture of milk and cereal is tipped in the same forward direction toward top opening 108 and to cover opening 121, through which the mixture flows and is dispensed to a user. Optionally, after a predetermined amount of cereal (dose) passes through cover opening 121, a cereal bridge forms behind cover opening 121 and within spout 134, stopping flow of cereal. Milk may continue to pass from lower container 108 into upper container 106 and through cover opening 121 as long as package 100 remains tipped. When package 100 is un-tipped, the cereal bridge is broken and milk returns to lower container 108, while optionally a small amount of milk may remain in a reservoir of divider 120, if a reservoir is present.

Any of the above package configurations can be used with any type of particulate food as a dry cereal. Dry cereals are well known and examples of useful cereals include any breakfast (a.k.a. "ready-to-eat" cereals) available as particulates, flakes, etc., produced from known food ingredients such as wheat grain, corn, rice, oats, barley, triticale, and the like, optionally including additional ingredients such as salt, minerals, protein, sugar fiber (e.g., bran, cellulose, pectin), vitamins, flavorants, colorants, etc.

Milk, if contained in a package, may be of the type generally stored at refrigerated temperatures, or at ambient (e.g., "shelf stable," "extended shelf life" or "ultra-pasteurized" milk) conditions.

The amounts of each of the cereal and milk contained in a lower container and an upper container, as described, can be any amount, and in particular can be an amount suitable for a single serving for one individual, e.g., about 0.75 to 1 cup (or about 6 to 8 ounces) of cereal and abut 8 to 10 ounces of milk.

The materials of the package and containers thereof can be any packaging material currently available or designed in the future, including, for example, glass, paper, cardboard, and polymeric materials known for use in these applications. A glass or polymeric material may be see-through (transparent, clear, colored, shaded), opaque, translucent, colored, etc. Materials may be thermoplastic or thermoformed, or may be coated paper or cardboard, or combinations of these in multiple layers. In preferred embodiments an internal sidewall surface can be made of or coated to exhibit a of a low surface energy, e.g., a surface energy below about 50 dynes per centimeter, or less than 40 or 38 dynes per centimeter. Exemplary low surface area materials include polystyrene, polyvinyl alcohol (PVA) polyethylene, polypropylene, and the like.

The invention claimed is:

1. A multi-container package comprising an upper container interior space and a lower container interior space separated by a divider, the package comprising
    a bottom,
    sidewalls extending from the bottom to a top,
    an opening at the top, and
    a divider comprising a fixed outer perimeter that is fixedly engaged with the sidewalls at a single, predetermined, and fixed vertical location above the bottom and below the top to provide an unchangeable volume for the lower container interior space, a peak extending from a first divider surface toward the top of the package, an aperture extending through the peak, and a reservoir extending around at least a portion of the perimeter and comprising the first divider surface and a wall that is spaced diametrically outward from the peak and that extends from the first divider surface toward the top of the package, and,
    the lower container interior space is defined by the bottom below, at sides by the sidewalls between the bottom and the divider, and by the divider above,
    the upper container interior space is defined by an upper container bottom comprising the divider, and at sides by the sidewalls extending from the divider to the top,
    wherein the package includes at least one passage between the upper container interior space and the lower container interior space and wherein the at least one passage comprises a space between the divider and the sidewalls.

2. A package according to claim 1 wherein divider surfaces include a divider bottom located below the divider perimeter.

3. A package according to claim 1 wherein the first divider surface includes a flat area in a plane parallel to a plane of a package bottom.

4. A package according to claim 1 wherein the divider includes forms in three-dimensions.

5. A package according to claim 1 wherein the aperture extending through the peak is located a distance less than one-third of a distance from a center of the divider to the perimeter.

6. A package according to claim 1 wherein the divider comprises a first aperture at a first location proximal to a perimeter of the divider, and a second aperture at a location proximal to the perimeter on an opposite side of the divider relative to the first location.

7. A package according to claim 6 wherein the first and second apertures are located between the perimeter and a distance two-thirds from a center of the divider.

8. A package according to claim 1 wherein the divider comprises a perimeter comprising multiple extended edge segments fixedly engaged with the sidewalls and at least one recessed segment between extended edge segments, the recessed segment forming a passage between the upper container interior space and the lower container interior space.

9. A package according claim 1 wherein the upper container interior space and the lower container interior space are connected by passages distributed around the upper container bottom so liquid can flow from the lower container into the upper container by tipping the package in any direction.

10. A method of preparing a package, the method comprising:
    providing a vessel comprising
        a bottom,
        sidewalls extending from the bottom to a top, and
        an opening at the top,
    providing a divider comprising a fixed outer perimeter and divider surfaces extending within the perimeter, the perimeter capable of fixedly engaging with the sidewalls at an interior of the vessel, a peak extending from a first divider surface toward the top of the vessel, an aperture extending through the peak, and a reservoir extending around at least a portion of the perimeter and comprising the first divider surface and a wall that is spaced diametrically outward from the peak and that extends from the first divider surface toward the top of the vessel, placing the divider in a single, predetermined, and fixed vertical location within the vessel to span the sidewalls at a location above the bottom and below the top, to define a lower container interior space having a fixed and unchangeable volume below the divider and an upper container interior space above the divider, with a passage fluidly connecting the upper container interior space and the lower container interior space, placing a quantity of dry cereal in the upper container interior space, and adding a quantity of milk to the opening at the top of the vessel so that it moves through the dry cereal and into the lower container interior space wherein the package includes at least one passage between the upper container interior space and the lower container interior space, and wherein the at least one passage comprises a space between the divider and the sidewalls.

11. A method according to claim 10 wherein the lower container interior space is defined by the bottom below, at sides by the sidewalls between the bottom and the divider, and by the fixed divider above, the upper container interior space defined by the fixed divider below, and at sides by the sidewalls extending between the divider to the top.

12. A method according to claim 10 wherein the perimeter engages the vessel by a snap-fit engagement in the fixed location.

* * * * *